(12) United States Patent
Trevillyan et al.

(10) Patent No.: US 7,930,872 B2
(45) Date of Patent: Apr. 26, 2011

(54) DRIVE SYSTEM FOR A FLAIL MOWER

(75) Inventors: Bart L. Trevillyan, Valley Springs, SD (US); Tom Kotas, Sioux Falls, SD (US); Brian E. Hardy, Sioux Falls, SD (US); Allen C Larson, Sioux Falls, SD (US)

(73) Assignee: Alamo Group, Inc., Seguin, TX (US)

( * ) Notice: Subject to any disclaimer, the term of this patent is extended or adjusted under 35 U.S.C. 154(b) by 160 days.

(21) Appl. No.: 12/291,597

(22) Filed: Nov. 12, 2008

(65) Prior Publication Data

US 2010/0115903 A1    May 13, 2010

(51) Int. Cl.
*A01D 34/53* (2006.01)

(52) U.S. Cl. .......................................... 56/249; 56/11.9

(58) Field of Classification Search .......... 56/11.7–11.9, 56/17.5, 222, 249, 294, 13.5, 10.6; 180/53.5
See application file for complete search history.

(56) References Cited

U.S. PATENT DOCUMENTS

| 2,589,845 | A | * | 3/1952 | Mott | 56/15.8 |
| 3,678,671 | A | * | 7/1972 | Scarnato et al. | 56/505 |
| 3,693,335 | A | * | 9/1972 | Mathews | 56/294 |
| 5,003,759 | A | * | 4/1991 | Brown | 56/249 |
| 5,412,932 | A | * | 5/1995 | Schueler | 56/249 |
| 5,485,718 | A | * | 1/1996 | Dallman | 56/294 |
| 5,666,794 | A | * | 9/1997 | Vought et al. | 56/15.2 |
| 5,896,734 | A | * | 4/1999 | Chesack et al. | 56/249 |
| 5,941,057 | A | * | 8/1999 | Chesack et al. | 56/249 |
| 6,857,253 | B2 | * | 2/2005 | Reimers et al. | 56/10.6 |
| 6,946,762 | B2 | * | 9/2005 | Rinholm et al. | 310/66 |
| 7,127,876 | B2 | * | 10/2006 | Ligouy | 56/16.4 R |
| 7,392,869 | B2 | * | 7/2008 | Carlson et al. | 180/53.5 |

OTHER PUBLICATIONS

"Shrink-fitting." Sep. 13, 2006. www.wikipedia.org. <http://web.archive.org/web/*/http://en.wikpedia.org/wiki/Shrink-fitting.*

* cited by examiner

*Primary Examiner* — Thomas B Will
*Assistant Examiner* — Mai Nguyen

(57) ABSTRACT

A direct drive system for the rotating cutter shaft assembly in a flail mower includes a internally splined collar having a thermal interfitment within and welded attachment to a rotating shaft assembly. An externally splined shaft from a drive motor mounted to the flail mower housing fits into the internally splined collar to provide rotational force to the rotating cutter shaft assembly.

12 Claims, 4 Drawing Sheets

DRIVE SYSTEM FOR A FLAIL MOWER

STATEMENT REGARDING FEDERALLY FUNDED RESEARCH AND DEVELOPMENT

The invention described in this patent application was not the subject of federally funded research or development.

FIELD

The present invention pertains to flail mowers; more particularly, the present invention pertains to the drive system for the rotating cutter shaft assembly to which the vegetation-cutting flail knives are attached.

BACKGROUND

The disclosed invention is best understood by understanding the environment in which it operates. A flail mower assembly 100, as shown in FIGS. 1A and 1B is typically mounted to a tractor 1000 to enable the cutting of vegetation on either side or the rear portion of the tractor 1000. When a flail mower assembly 100 is used to cut grasses and brush that grow along the side of a roadway the flail mower assembly 100 is typically positioned alongside the tractor 1000 as shown in FIG. 1A. Alternatively, as shown in FIG. 1B, the flail mower assembly 100 may be mounted on the end of an arm 300 extending outwardly from the tractor 1000 for trimming vegetation on sloped surfaces. As may be seen in FIG. 3 the typical prior art drive system for the rotating cutter shaft assembly within a flail mower assembly 100 is a belt and pulley drive system 200. While belt and pulley drive systems 200 have been used by flail mower assembly manufacturers for many years, such belt and pulley systems 200 continue to present difficulties for the users of flail mower assemblies.

The belts in the prior art belt and pulley drive systems of flail mower assemblies stretch and wear. Eventually the belts stretch and wear to the point of rendering prior art belt and pulley drive systems non-functional. As the belts in the prior art belt and pulley drive systems wear over time, the horsepower delivered to the rotating cutter shaft assembly of a flail mower assembly is reduced because of belt slippage with respect to the pulleys. Thus, power transfer to the rotating cutter shaft assembly 124, as shown in FIG. 2, is reduced from that as when the belt was new. Accordingly, the efficiency of the flail mower assemblies with a prior art belt and pulley drive system decreases over time as the belts wear out and more fuel is needed to cut a predetermined amount of vegetation. Replacing worn out belts results in increased maintenance costs for the mower operator and loss of operational time for the flail mower assembly 100.

Further failure may occur with the belt tensioning mechanism in prior art belt and pulley drive systems. An example of a prior art belt tensioning system 210 appears in FIG. 3. Used to maintain proper belt tension, the belt tensioning mechanism adds additional moving parts to a prior art belt and pulley drive system, and the additional parts can easily fail. Failure of the belt tensioning mechanism 210 in prior art belt and pulley drive systems for flail mower assemblies also results in increased maintenance costs and loss of operational time for the flail assembly 100.

Accordingly, a need remains in the art for a flail mower assembly drive system which costs less to maintain, that reduces power loss caused by belt slippage, has fewer moving parts, and provides greater operating efficiency.

SUMMARY

The disclosed flail mower assembly drive system and method of the present invention overcomes the efficiency loss and maintenance problems associated with prior art belt and pulley drive systems for flail mower assemblies. Further, the disclosed flail mower assembly drive assembly system costs less to maintain, eliminates the power loss associated with worn belt and pulley systems, has fewer moving parts, and provides greater operating efficiency.

The disclosed flail mower assembly drive system is a direct drive system. Specifically, the flow of rotational power from the drive motor is connected directly to the rotating cutter shaft assembly to which the flail knives are hindgedly mounted.

In the disclosed flail mower assembly drive system, the motor is attached to the housing portion which surrounds the rotating cutter drive shaft assembly of the flail mower assembly. Specifically, a combination bearing housing and motor mount is attached to the housing for the flail mower assembly. By incorporating a bearing housing with the motor mount the size of the drive system is reduced, thereby allowing the flail mower assembly to operate closer to the tractor. Such positioning enables the cutting of foliage growing close to the path of the tractor. Also, such positioning enables the mower housing to be moved out of the positions shown in FIGS. 1A and 1B and stowed vertically closer to the tractor for transport.

The output shaft of the motor which provides rotational power to the rotating cutter shaft assembly is externally splined. This externally splined shaft mates with an internally splined collar affixed to the driven end of the rotating cutter shaft assembly. Specifically, the internally splined collar is connected to the rotating cutter shaft assembly by a thermal interfitment within a recess or counterbore formed in the end of a stub shaft positioned on the driven end of the rotating cutter shaft assembly. In an alternate embodiment, the internally splined collar may also be welded to the stub shaft on the driven end of rotating cutter shaft assembly in addition to the thermal interfitment of the internally splined collar within the recess formed in the stub shaft portion of the rotating cutter shaft assembly.

BRIEF DESCRIPTION OF THE DRAWING FIGURES

A still better understanding of the drive system for providing rotational power to the rotating cutter shaft assembly portion of a flail mower assembly may be had by reference to the drawing figures wherein.

DESCRIPTION OF THE EMBODIMENTS

Figure 1A:
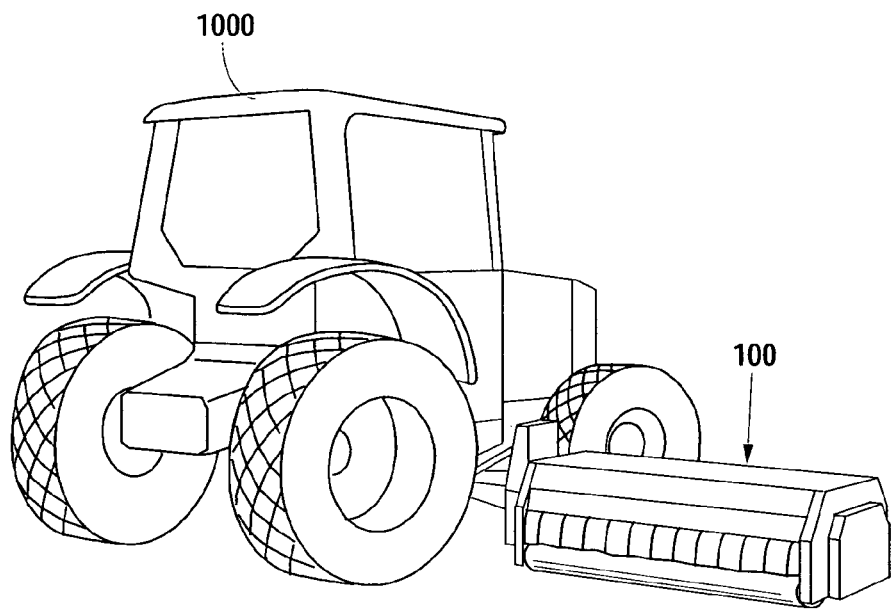
FIG. 1A is a rear perspective view of a tractor with a flail mower mounted to the underside thereof.
Figure 1B:
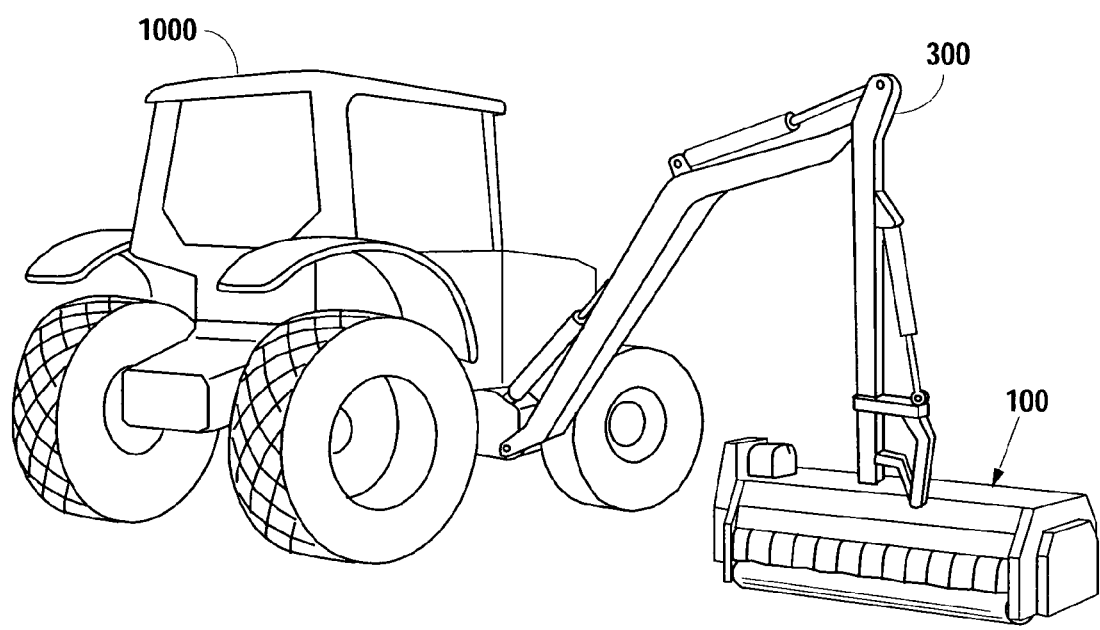
FIG. 1B is a rear perspective view of a flail mower attached on the end of an arm extending outwardly from the side of a tractor.
Figure 2:
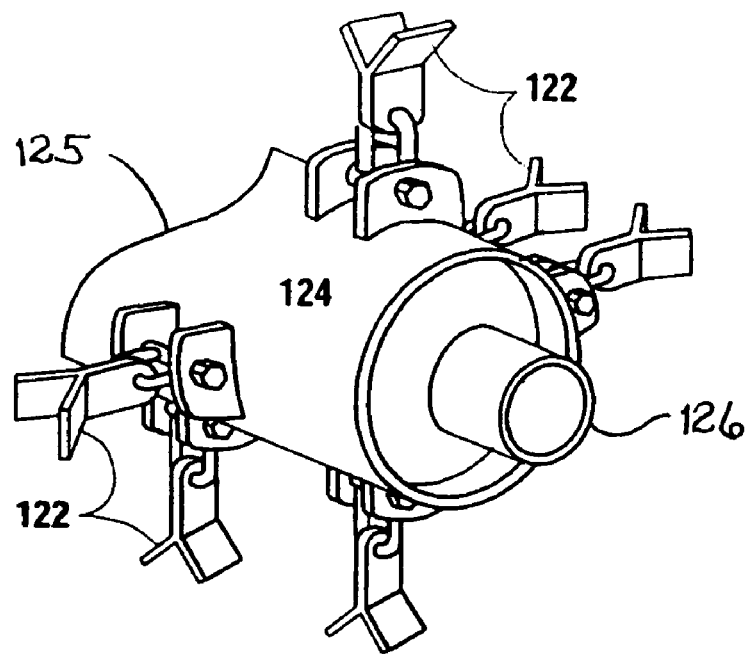
FIG. 2 is a perspective view of a portion of a rotating cutter shaft assembly showing the flail knives hingedly attached thereto.
Figure 3:
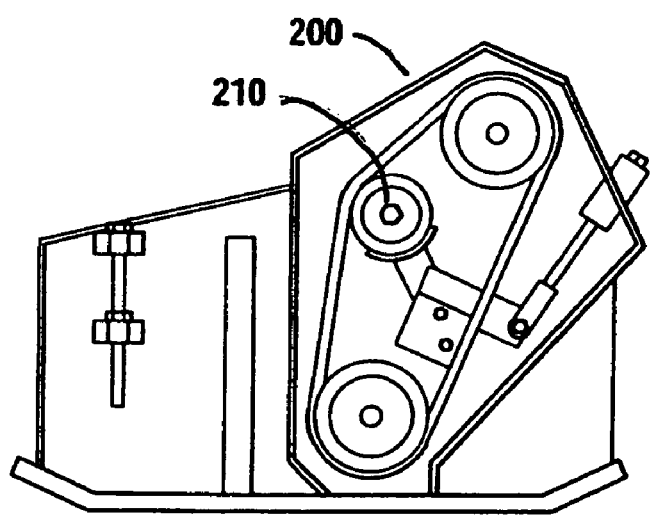
FIG. 3 is a side elevational view of a prior art belt and pulley flail mower assembly drive system.
Figure 4:
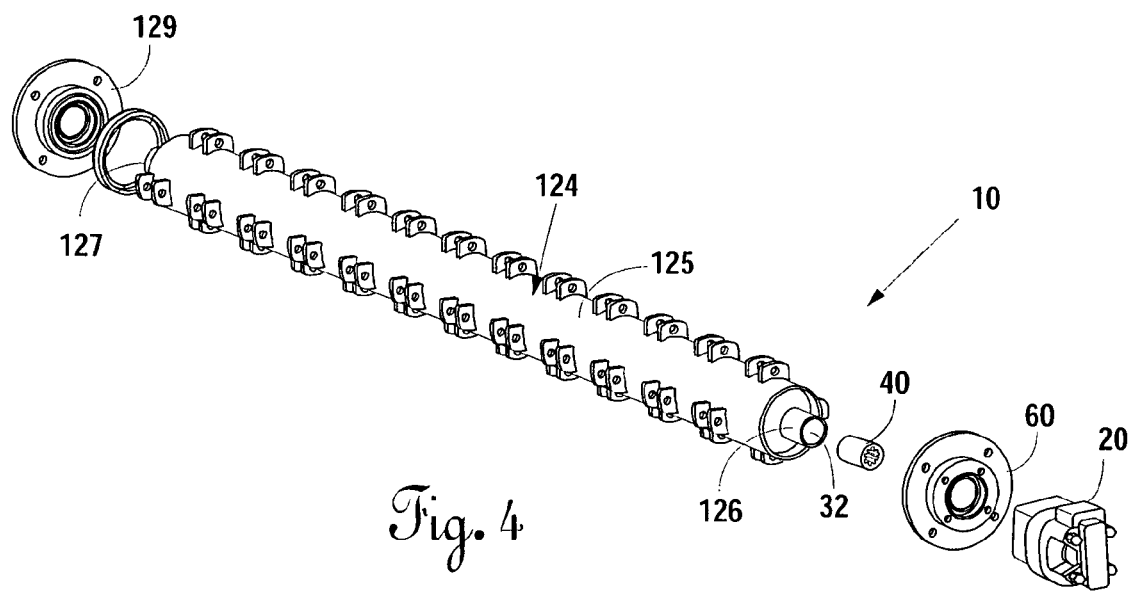
FIG. 4 is an exploded perspective view of the disclosed drive system for flail mower.

The present invention is a direct drive system 10 for the rotating cutter shaft assembly 124 portion of a flail mower assembly 100. As shown in FIG. 4 and in FIG. 5 rotational power is transferred directly from a drive motor 20 mounted to the flail mower assembly 100, a hydraulic motor in the preferred embodiment, to the rotating cutter shaft assembly 124. As shown in FIG. 2, it is the rotating cutter shaft assembly 124 which spins the flail knives 122, which are hingedly mounted to a hollow tubular shaft 125, to enable cutting the vegetation over which the flail mower assembly 100 passes by impact of the vegetation with the end of the spinning flail knives.

The disclosed direct drive system 10 is better understood by the realization that the rotating cutter shaft assembly 124 includes the hollow tubular shaft 125. Positioned within the tubular shaft 125 is a first stub shaft or solid cylindrical member 126 mounted within a disc 131 which extends to the inside wall of the hollow tubular shaft 125 as shown in FIG. 2 and in FIG. 5. The disc 131 is affixed within the hollow tubular shaft 125 at the driven end of the rotating cutter shaft assembly 124.

A second stub shaft or solid cylindrical member 127 is mounted within a disc 133. The disc 133 is affixed within the hollow tubular shaft 125 at the non-driven end of the rotating cutter shaft assembly 124. When the rotating cutter shaft assembly is turned by the motor 20, the ends of the flail knives 122 move outwardly by centrifugal force. The moving ends of the rotating flail knives 122 move fast enough to cut the vegetation, specifically the thick grasses and the small brush found along the side of the roads, over which the flail mower assembly 100 passes.

Figure 5:
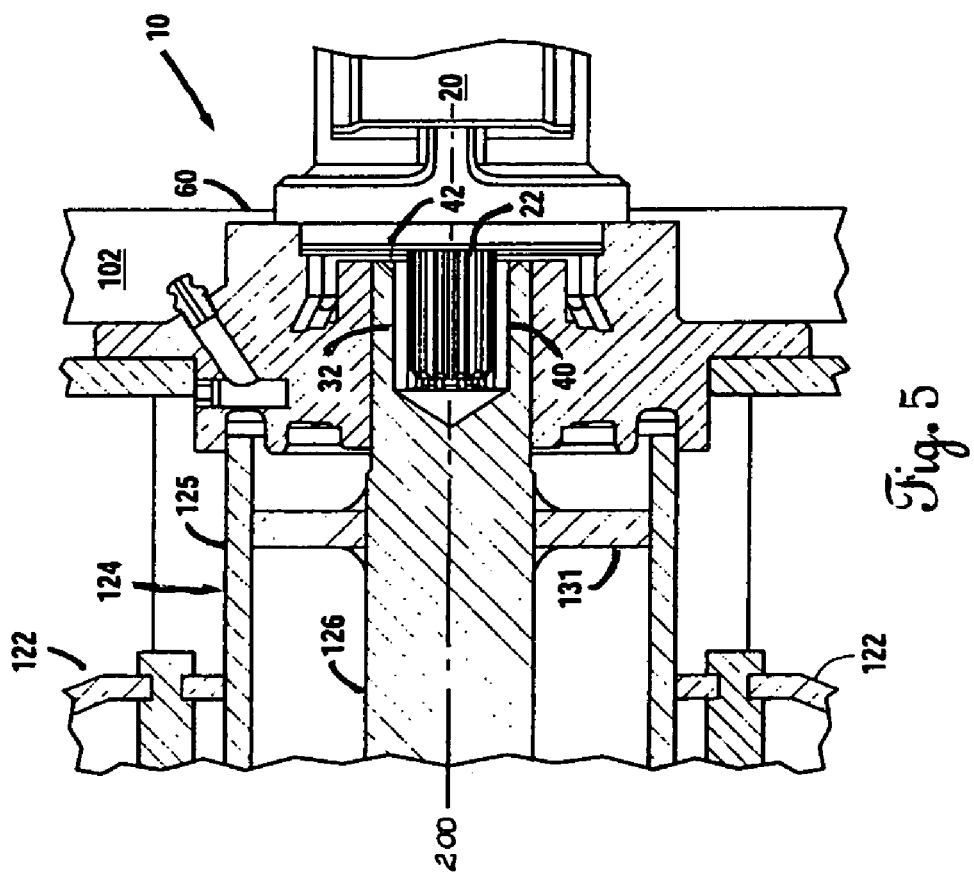
FIG. 5 is an elevational view, in partial section, of the driven end of the rotating cutter shaft assembly.

To enable proper spinning and minimization of vibration of the rotating cutter shaft assembly 124, the long axis or axis of rotation of the rotating cutter shaft assembly 125, the long axis of rotation of the first solid cylindrical member 126 and the long axis or axis of rotation of the second solid cylindrical member 127 must all be substantially co-axial. As shown in FIG. 5 and in FIG. 6 only a small portion of the first solid cylindrical member 126 and the second solid cylindrical member 127 extends past the plane of the open end of the hollow tubular shaft 125. This enables the bearing support at either end of the rotating cutter shaft assembly 124 to be nearly adjacent to the open ends of the hollow tubular shaft 125 to minimize vibration.

Formed within the end of the first solid cylindrical member 126 and co-axial with its long axis is a recess or counterbore 32 extending inwardly into the first solid cylindrical member 126. Within the recess or counterbore 32 is positioned an internally splined collar 40. The internally splined collar 40 is held in place within the first solid cylindrical member 126 by the use of a thermal interfitment. Specifically, the internal diameter dimension of the recess or counterbore 32 is caused to expand by heating the first solid cylindrical member 126 to approximately 400° F. and then inserting the unheated internally splined collar 40 therein. The first solid cylindrical member 126 and the internally spliced collar 40 are then allowed to reach the same temperature. The reduction in size of the recess 32 during the cooling process forms a thermal interfitment between the first solid cylindrical member and the internally splined collar 40. This thermal interfitment is strong enough to transmit the torque provided by the motor 20 through the connection of the external splines on the output shaft 22 of the motor 20 with the internal splines within the internally splined collar 40, thence through the thermal interfitment, thereby causing the rotating cutter shaft assembly 124 to turn as one with the externally splined output shaft 22 of the motor 20. Accordingly, the flail mower assembly drive system 10 of the present invention is a direct drive system from the motor 20 to the rotating cutter shaft assembly 124.

If needed, it has also been found that the internally splined collar 40 may also be welded 42 into position within the recess or counterbore 32 of the first solid cylindrical number 126 after the thermal interfitment of the splined collar 40 within the recess or counterbore 32 is completed. As previously indicated, a hydraulic motor 20 is used in the preferred embodiment however, those of ordinary skill in the art will understand that the disclosed invention may also provide a direct drive system for a flail mower enabling use with other types of motors, such as an electric motor.

Those of ordinary skill in the art will understand that the hollow tubular shaft 125, the two discs 131, 133, and solid cylindrical members 126, 127 may be assembled without rotation of the hollow tubular shaft 125 during the manufacturing process to enable proper spinning and minimization of vibration as stated above. Specifically, the hollow tubular shaft 125, the discs 131, 133 and solid cylindrical members 126, 127 may be assembled to be co-axial about a common center line 200 as shown in FIG. 5 and in FIG. 6.

The advantage provided by the thermal interfitment of the internally splined collar 40 within the recess or counterbore 32 is in manufacturing cost. If it were necessary to form internal splines within the counterbore of the first solid cylindrical member 126, when positioned within the hollow tubular shaft 125, a large machine would be required. According to the present invention, only the internally splined collar 40 need be machined and then affixed within the counterbore 32 to be co-axial with the long axis of the first solid cylindrical member 126. When affixed with solid cylindrical member 126 internally splined collar 40 becomes coaxial about the common centerline of hollow tubular shaft 125, disc 131, disc 133 and solid cylindrical member 127.

As shown in FIG. 5, a combination bearing housing and motor mount assembly 60 is attached to the flail mower housing 102. When the motor 20 is affixed to the combination bearing housing and motor mount assembly 60, the externally splined output shaft 22 from the motor 20 is positioned for interfitment within the internally splined collar 40 only a small distance away from the plane of the end of the hollow tubular shaft 125. As previously indicated, the compact size of the combination bearing housing-motor mount assembly 60 allows for maintaining close cutting to the tractor 1000 and minimizes vibration.

Rotational force from the externally splined output shaft 22 transmitted by mechanical contact of the splines within the internally splined collar 40 is transmitted to the shaft 126, thence to disc 131, thence to the hollow shaft 125 which causes the rotating cutter shaft assembly 124 to turn. When the rotating cutter shaft assembly 124 turns, the ends of the flail knives 122 move outwardly to engage and shorten the length of the grasses and small brush with which they come into contact.

Figure 6:
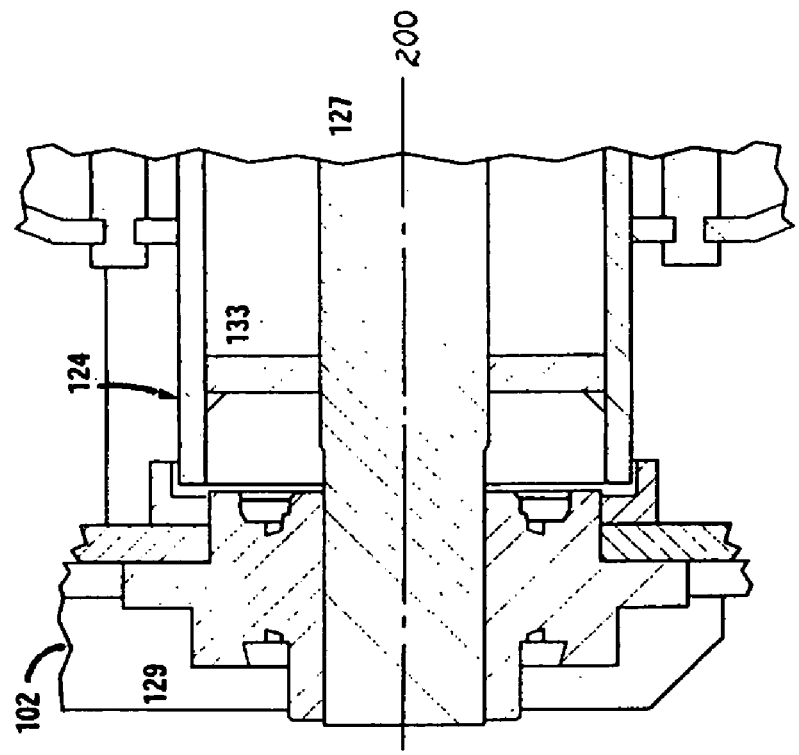
FIG. 6 is an elevational view, in partial section, of the supported or non-driven end of the rotating cutter shaft assembly.

Shown in FIG. 6 is the supported or non-driven end of the cutter shaft assembly 124. The end of the second solid cylindrical member 127 is contained within a mounting bearing 129. The mounting bearing 129 is in turn affixed or mounted to the mower housing 102. It is the rotational force on hollow tubular shaft 125 which is transmitted to disc 133, thence to shaft 127 which is mounted within bearing 129.

While the foregoing invention has been described according to its preferred and alternate embodiments, those of ordinary skill in the art will understand that still other embodiments have been enabled by the foregoing disclosure. Such other embodiments shall fall within the scope and meaning of the appended claims.

What is claimed is:

1. A drive system for providing rotational power to a rotating cutter shaft assembly of a housing enclosed flail mower, said rotating cutter shaft assembly including a hollow tubular shaft having flails hingedly affixed to the external surface thereof, said drive system comprising:
   a motor including an externally splined output shaft;
   first and second cylindrical shafts mounted within either end of the hollow tubular shaft to be co-axial with the hollow tubular shaft;
   an internally splined collar constructed and arranged for thermal interfitment within said first solid cylindrical shaft to be co-axial with the axis of rotation of the rotating cutter shaft assembly;
   a mounting bracket for affixing said motor to the housing and for containing a bearing enabling rotation of the rotating cutter shaft assembly which enables the insertion of the said externally splined output shaft from the motor into said internally splined collar within the rotating cutter shaft assembly;
   whereby a direct drive of the rotating cutter shaft assembly by said motor is provided by mechanical contact between said externally splined output shaft and said internally splined collar.

2. The drive system as defined in claim 1 further including a weld attaching said internally splined collar to the rotating cutter shaft assembly.

3. The drive system as defined in claim 1 wherein said motor is a hydraulic motor.

4. The drive system as defined in claim 1 wherein said motor is an electric motor.

5. A flail mower assembly comprising:
   a mower housing;
   said mower housing surrounding a rotating cutter shaft assembly, said rotating cutter shaft assembly further including a plurality of flail knives hingedly mounted to a hollow tubular shaft;
   said hollow tubular shaft having co-axial first and second cylindrical members positioned in opposing ends thereof and to be co-axial therewith;
   said second cylindrical member being rotatably positioned within a mounting bearing affixed to said mower housing;
   said first cylindrical member being rotatably positioned within a bearing contained in a bearing housing affixed to said mower housing;
   said first cylindrical member further including an internally splined collar constructed and arranged for thermal interfitment into a recess formed within and being co-axial with said first cylindrical member;
   a motor including an externally splined output shaft positioned for insertion into said internally splined collar, said motor being mountable to said bearing housing;
   wherein said external splines on the output shaft of said motor engage said internal splines within said collar to transmit rotational force to said first cylindrical member which transmits rotational force to said hollow tubular shaft which causes the ends of said flail knives to move outwardly by centrifugal force.

6. The flail mower assembly as defined in claim 5 wherein said motor is a hydraulic motor.

7. The flail mower assembly as defined in claim 5 wherein said motor is an electric motor.

8. The flail mower assembly as defined in claim 5 further including a welded attachment between said internally splined collar and said first solid cylindrical member.

9. A flail mower comprising:
   a rotating cutter assembly, contained within a housing, said rotating cutter assembly including a hollow tubular shaft and a plurality of flail knives hingedly mounted thereto for reducing the length of vegetation when rotation of said hollow tubular shaft portion of said rotating cutter shaft assembly causes the ends of sail plurality of flail knives to cut said vegetation;
   a motor mounted to said housing, said motor including an externally splined output shaft;
   first and a second cylindrical members positioned within either end of said hollow tubular shaft to be coaxial therewith;
   an internally splined collar constructed and arranged for thermal interfitment within said first cylindrical member and to be coaxial with said rotating cutter shaft assembly;
   a mounting bracket for affixing said motor to said housing and for mounting a bearing for enabling the rotation of said rotating cutter shaft assembly, said mounting bracket further enabling the insertion of said externally splined output shaft of said motor into said internally splined collar within said rotating cutter shaft assembly;
   whereby said external splines on the output shaft of said motor engage said internal splines within said collar to transmit rotational force to said first cylindrical member which transmits said rotational force to said hollow tubular shaft which causes the ends of said flail knives to move outwardly by centrifugal force.

10. The flail mower as defined in claim 9 wherein said motor is a hydraulic motor.

11. The flail mower as defined in claim 9 wherein said motor is an electric motor.

12. The flail mower as defined in claim 9 further comprising:
   a welded connection between said internally splined collar and said rotating cutter shaft assembly.

* * * * *